United States Patent [19]
Horton

[11] 3,800,308
[45] Mar. 26, 1974

[54] SYNCHRONIZING MECHANISM FOR FLASH FIRING AND SHUTTER ACTUATION

[75] Inventor: William Howard Horton, Penfield, N.Y.

[73] Assignee: Eastman Kodak Company, Rochester, N.Y.

[22] Filed: Oct. 24, 1972

[21] Appl. No.: 299,972

[52] U.S. Cl............................ 354/142; 240/1.3
[51] Int. Cl. .......................................... G03b 15/04
[58] Field of Search ............. 95/11.5 R, 11 L, 11 R; 240/1.3; 431/92, 93

[56]  References Cited
UNITED STATES PATENTS
3,665,827  5/1972  Irwin............................... 95/11.5 R
3,688,660  9/1972  Johnson ............................ 95/11 L
3,687,033  8/1972  Beach ............................. 95/11.5 R
3,680,454  8/1972  Lange.................................. 95/11 L
3,690,236  9/1972  Ettischer.......................... 95/11.5 R OTHER PUBLICATIONS
T887,021, Defensive Publication, Actuating Mech. for Mechan. Fireable Flash Devices, June, 1971 by Pickering et al.

Primary Examiner—Robert P. Greiner

[57] ABSTRACT

Photographic apparatus having a shutter mechanism and adapted for use with a flash device is provided with a mechanism for actuating the shutter and firing the flash device in synchronism. The mechanism stores energy in response to depression of the camera body release, and releases the stored energy to cause shutter actuation in response to flash firing caused by continued depression of the camera body release.

5 Claims, 6 Drawing Figures

SYNCHRONIZING MECHANISM FOR FLASH FIRING AND SHUTTER ACTUATION

BACKGROUND OF THE INVENTION

1. Field of the Invention

The present invention relates generally to photographic apparatus and in particular to a mechanism for synchronizing the actuation of a shutter mechanism and the firing of a flash device.

2. Description of the Prior Art

In order to overcome various well known problems associated with electrically firable flashlamps, mechanically firable lamps have recently been developed that are actuated by percussive means. In one from, such lamps have been incorporated into multilamp devices which include a pre-energized striker associated with each lamp. The striker is releasable to percussively impact and fire the lamp. Such mechanically operable flash devices are characterized by highly reliable actuating systems which are not dependent upon electrical contacts or electrical energy sources.

A synchronizing mechanism must be provided in any photographic apparatus which is to be utilized with a flash device. The synchronizing mechanism is designed to insure maximum scene illumination during the time of shutter actuation. Synchronization may be accomplished in many ways. In one such form, a high energy member is first energized, for example in response to film winding, and then is released by operator control to effect the operation of both the shutter mechanism and the flash device. Such a syncrhonizing mechanism is disclosed in U.S. Pat. No. 3,640,196. In another mechanism, the body release is itself used as a synchronizing member with separately energized members being used to cause actuation of the shutter mechanism and firing of the flash device after movement of the body release a predetermined distance. Such a mechanism is disclosed in U.S. Pat. No. 3,544,250. The first mentioned method of synchronization requires complex linkages to transmit energy from the film winding or other camera operating mechanism and to store energy in the high energy member. The additional mechanical structures provide increased opportunity for reliability problems as well as increasing the manufacturing costs of the camera. The second mentioned method of synchronization also requires complex linkages and, in addition, is dependent upon the operator's method of actuating the camera. In some cases, flash firing may occur without shutter actuation or, depending upon the relative position of various structural members, shutter actuation may occur without flash firing.

SUMMARY OF THE INVENTION

Accordingly, it is an object of the present invention to provide an improved mechanism for synchronizing firing of a flash device and actuation of the shutter mechanism in photographic apparatus.

Another object of the present invention is to provide such an improved mechanism which stores energy during movement of the camera body release and releases such energy upon actuation of the flash device.

Still another object of the present synchronizing is to provide such an improved mechanism wherein the syncrhonizing member directly actuates the flash device and, upon continued movement, actuates the shutter mechanism.

These and other objects are accomplished according to the present invention by a synchronizing mechanism including a synchronizing member movable to actuate the flash device under urging of the body release. During initial movement of the body release, a spring operatively connected between the body release and the synchronizing member stores energy until a direct mechanical connection is established between the body release and the synchronizing member. However, the stored energy is not sufficient to cause release of a pre-energized striker of an associated flashlamp. Continued movement of the body release causes movement of the synchronizing member to release the pre-energized striker. Upon such release, the synchronizing member is driven by the spring and such movement is coupled to the shutter actuating mechanism, thereby causing synchronous actuation of the shutter mechanism and firing of the flash device.

BRIEF DESCRIPTION OF THE DRAWINGS

In the description of the preferred embodiment of the invention, reference is made to the accompanying drawings in which.

DESCRIPTION OF THE PREFERRED EMBODIMENT

Because photographic cameras are well known, the present description will be directed in particular to elements forming part of, or cooperating more directly with, the present invention. Camera elements not specifically shown or described herein are understood to be selectable from those in the art.

Figures 1, 2:
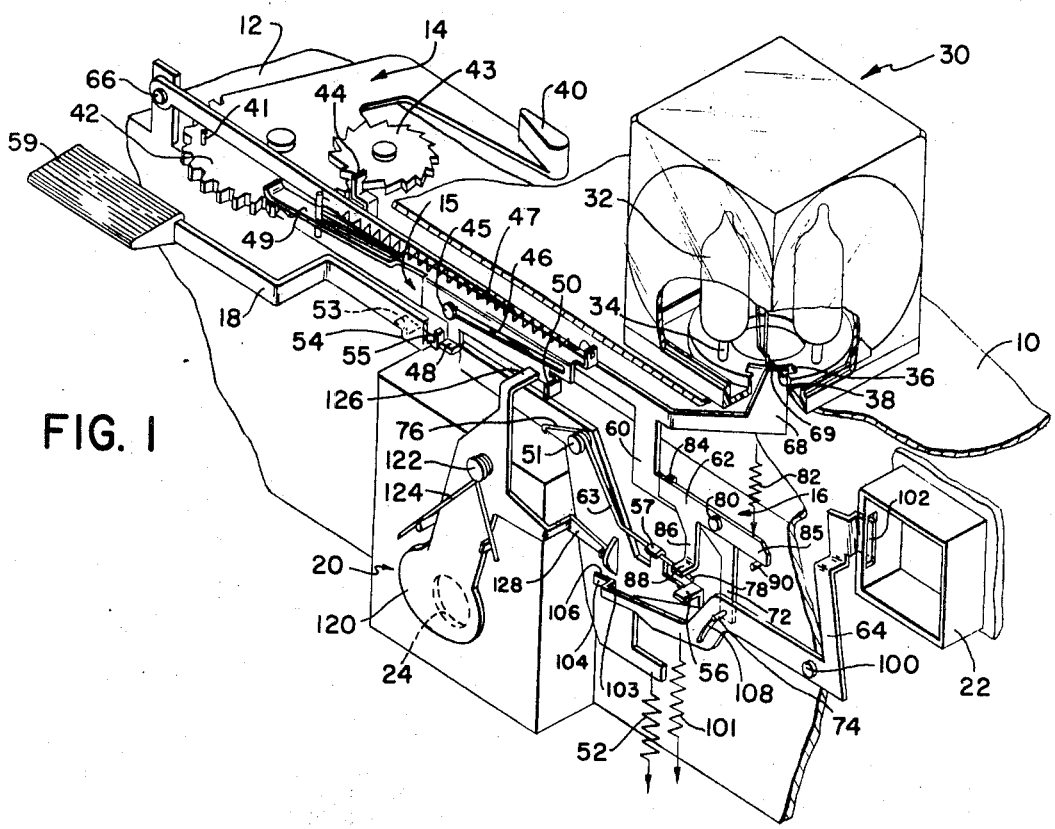
FIG. 1 is a perspective view of photographic apparatus incorporating the synchronizing mechanism of the present invention. A multilamp flash device is illustrated mounted on the apparatus and in position for operation.
FIG. 2 is a front view of the photographic apparatus of FIG. 1 with the body release partially depressed just prior to flash actuation.

In FIG. 1, photographic apparatus according to this invention is illustrated which is adapted for use with a multilamp flash device of the type known in the art. The photographic apparatus has a top wall 10 broken away to reveal an inner frame member 12. Mounted on frame member 12 are a film advance mechanism shown generally as 14, a shutter driver 15, a flash cube sensing and firing mechanism shown generally as 16, a body release lever 18 and a shutter mechanism shown generally as 20. The camera further includes a viewfinder 22 and a shutter aperture 24 shown in phantom in FIG. 1.

A multilamp flash unit shown generally as 30 is operatively coupled to a socket in top wall 10 of the camera. Such a unit is fully described in U.S. Pat. No.

3,537,805. Flash unit 30 comprises a plurality of individual flashlamps 32, each of which has a percussive primer 34 associated with its base. Each flashlamp 32 further has associated with it an aperture 36 in the base of flash unit 30 and a pre-energized striker wire 38 which may be released for movement into engagement with primer 34, thereby causing the ignition of associated flashlamp 32.

Film advance mechanism 14 is of conventional design and includes an actuating member 40 which extends outwardly of the camera for actuation by the operator. Actuating member 40 has an integrally formed indexing pin 41 and a gear sector 42 which engages a mating gear 43 associated with a film take-up spool (not illustrated) located within the camera. Movement of member 40 is transmitted through gears 42 and 43 to the take-up spool for advancing the film. In many such cameras, a metering pawl 44 is provided for engagement with gear 43 thereby blocking advancement of the film after a predetermined amount of film has been advanced. Metering movement and withdrawal of pawl 44 may be accomplished in any manner which is known in the art.

Shutter driver 15 is movable mounted on a fixed pin 45 held within an elongated slot 46 in driver 15 and is biased leftward by a spring 47. Driver 15 further includes a downwardly extending arm terminating in a release lug 48, an elongated indexing arm 49 which is engageable by indexing pin 41 on actuating member 40 and a forwardly extending drive lug 50.

Body release lever 18 is pivotally mounted on a fixed pin 51 and is biased in a clockwise direction by spring 52 to a position in which a tab 59 extends outwardly of the camera for actuation by the operator. Lever 18 has an integrally formed daylight mode shutter release arm 54. Arm 54 extends backwardly from lever 18, has a cam surface 53, and ends in a upwardly extending release lug 55. Lever 18 further has an integrally formed flash actuating lug 56, a spring holding lug 57 and a forwardly extending cam 58. The specific functions of lugs 55, 56 and 57 and cam surfaces 53 and 58 will be described in more detail hereinafter.

Sensing and firing mechanism 16 includes a sensing lever 60, an intermediate drive lever 62, a drive spring 63 and an actuating lever 64. Sensing lever 60 is pivotally mounted on frame 12 by fixed pin 66. Lever 60 has an upwardly extending sensing and actuating arm 68 which terminates in an end 69 and further has a downwardly extending shutter release arm 72 to which is affixed a forwardly extending pin 74. Sensing lever 60 operates under control of a conventional T-bar structure, such as is illustrated in U.S. Pat. No. 3,624,726, which is responsive to the presence of a flash unit 30 operatively engaged with the camera. Upon insertion of flash unit 30 in the camera socket, the T-bar structure causes counter-clockwise rotation of lever 60 so that sensing arm 68 extends through an aperture 36 in flash unit 30 with end 69 of sensing arm 68 resting upon pre-energized striker wire 38. In the absence of a striker wire 38, thereby indicating a fired flash unit is in the firing position, sensing lever 60 will rotate further in a counterclockwise direction thereby permitting arm 68 to extend upwardly into the flash unit. When a flash unit 30 is removed from the camera socket, the T-bar structure causes clockwise rotation of lever 60, thereby removing sensing arm 68 from aperture 36 and lever 60 will be held in this retracted position until a flash unit 30 is inserted in the camera socket.

Drive spring 63 is mounted on pin 51 and has opposed ends 76 and 78. End 76 engages body release lever 18 while end 78 is releasably held by lug 57 on body release lever 18.

Intermediate drive lever 62 is pivotally mounted on sensing lever 60 by a fixed pin 80 and is biased in a clockwise direction by a spring 82 until lever 62 comes into engagement with a blocking lug 84 on sensing lever 60. Driver lever 62 includes an end 85 and a downwardly extending drive arm 86 which terminates in a drive lug 88. Drive lug 88 is positioned for engagement with lug 56 of lever 18 and end 78 of drive spring 63. End 85 is positioned for engagement with a stop 90 mounted on frame member 12.

Actuating lever 64 is pivotally mounted on a fixed pin 100 which is mounted on frame 12 and is biased in a counterclockwise direction by spring 101. One end of actuating lever 64 terminates in an indicating flag 102 which is positionable within viewfinder 22 in the camera. The other end of actuating lever 64 has an offset release arm 103 terminating in a shutter drive lug 104 having a cam surface 106. Lever 64 further defines an elongated slot 108, through which pin 74 on sensing lever 60 extends.

Shutter actuating mechanism 20 includes a conventional shutter blade 120, pivotally mounted on a fixed pin 122 mounted on frame member 12 and biased in a clockwise direction by spring 124 so as to cover aperture 24. Shutter blade 120 includes a daylight drive lug 126 and a flash drive lug 128. Drive lug 126 is positioned in the path of movement of drive lug 50 on shutter driver 15 whereas drive lug 128 is positioned in the path of movement of drive lug 104 on actuating lever 64.

From the above description, it can be seen that the illustrated apparatus incorporates two mechanisms for driving shutter blade 120 to its open position, shutter driver 15 and actuating lever 64. Each of these mechanisms is independently driven and each will impart a different amount of energy to blade 120. Thus, the apparatus is designed to provide two speeds of shutter operation, one for daylight and one for flash. The two modes of operation will now be described in more detail.

Figure 3:
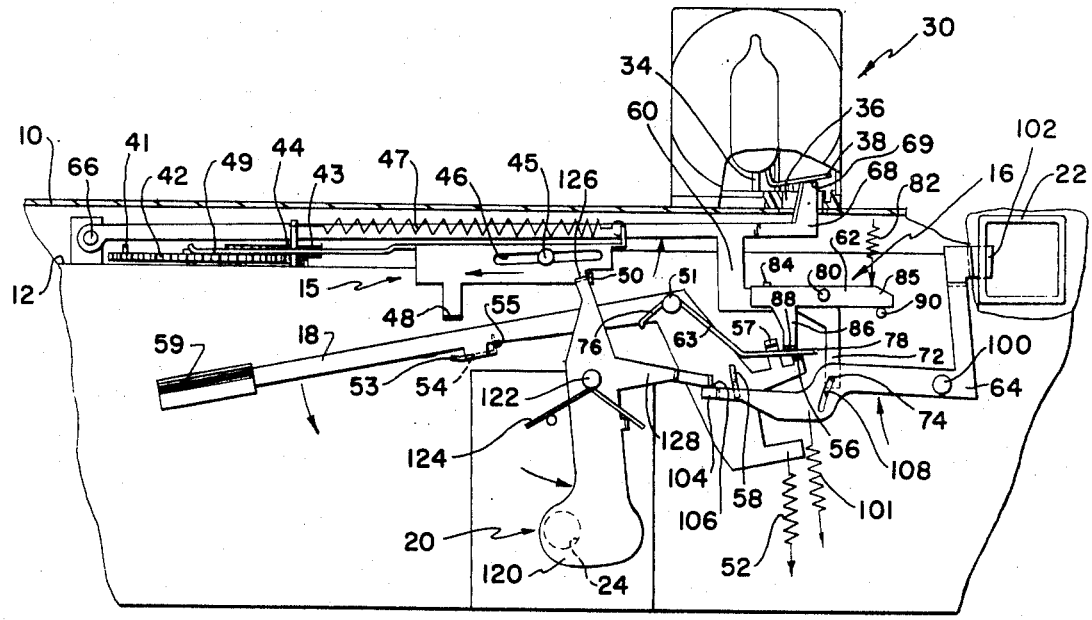
FIG. 3 is a front view of the photographic apparatus with the body release further depressed and the pre-energized striker in the instant of being released.
Figure 4:
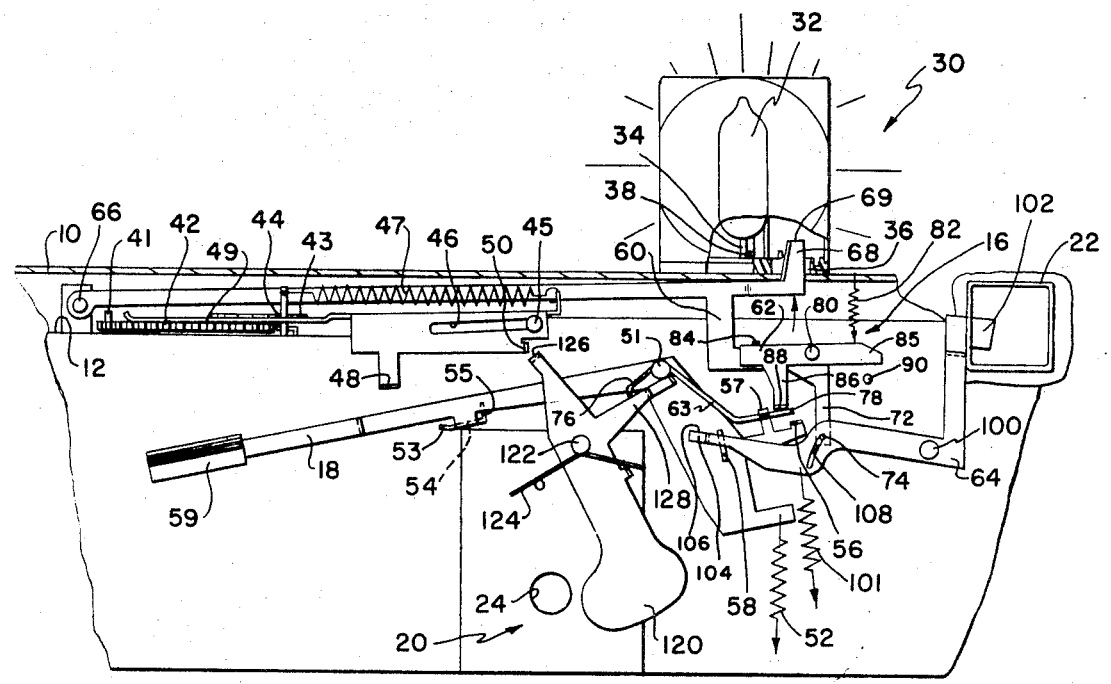
FIG. 4 is a front view showing the pre-energized striker fully released and the shutter actuating mechanism having driven the shutter to an open position.

For flash operation, the camera is illustrated in FIG. 1 with the film advanced and with a multilamp flash unit 30 inserted in the camera socket with a flashlamp 32 in firing position. The camera operator now initiates operation of the camera mechanism by depressing downwardly on index tab 53, thereby causing counterclockwise rotation of body release lever 18. As lever 18 rotates, end 78 of drive spring 63 comes into engagement with lug 88 of intermediate drive lever 62, as illustrated in FIG. 2. Continued rotation of lever 18 frees end 78 from engagement with spring holding lug 57 and causes stressing of spring 63. Stressing of spring 63 continues until lug 56 on lever 18 comes into engagement with drive spring 63 and lug 88, as illustrated in FIG. 3, causing upward movement of arm 68 of sensing lever 60 through aperture 36. Upward movement of arm 68 continues until pre-energized striker wire 38 is released for movement toward primer 34 to cause percussive firing of flashlamp 32. It is to be noted that drive spring 63 is designed so that the energy stored during initial movement of lever 18 is insufficient to release preenergized striker wire 38, thereby insuring that release occurs only after engagement of drive spring 63 and lugs 56 and 88. Upon release of pre-energized striker wire 38, however, drive spring 63 operates to drive sensing lever 60 further in a counterclockwise direction about pin 66, as illustrated in FIG. 4. Such movement is transmitted through fixed pin 74 to actuating lever 64 and results in clockwise rotation of actuating lever 64. Shutter drive lug 104 is thereby brought into engagement with lug 128 on shutter blade 120 causing counterclockwise rotation of shutter blade 120 to an open position as is best illustrated in FIG. 4. Shutter driver 15 will also be freed for movement by disengagement of lug 55 from lug 48 but this occurs at a time which precludes drive lug 50 on driver 15 from engaging lug 126 on shutter blade 120. Thus, synchronization is achieved by actuating the shutter mechanism only after the pre-energized striker wire has been released for movement toward the primer of a flashlamp.

Exposure is terminated by return of shutter blade 120 to the position illustrated in FIG. 1 under the bias of spring 124. Exposure time will be dependent upon the energy imparted to blade 120 by engagement of lugs 104 and 128. Since lug 104 is driven by drive spring 63 after flash actuation, the flash mode exposure time is determined by the energy stored in drive spring 63 during rotation of body release lever 18 and may be designed for an optimum exposure under flash conditions.

Upon the operator's release of tab 59, body release lever 18 will return to the position illustrated in FIG. 1 under the bias of spring 52. However, sensing and firing mechanism 16 will remain as illustrated in FIG. 4 until an unfired flashlamp is indexed to the firing position. This may be done in any known manner and may be in response to film advance or exposure termination. During flash unit indexing, sensing lever 60 will be rotated in a clockwise direction to remove arm 68 from within flash unit 30. Pin 74 will thus move downwardly permitting actuating lever 64 to rotate in a counterclockwise direction under the bias of spring 101. During rotation of lever 64, cam 58 will engage cam surface 106 on lug 104, causing lug 104 to pass lug 128 without engagement. Thus, shutter blade 120 will not be moved during return of sensing and firing mechanism 16 to its operative condition as illustrated in FIG. 1. When indexing is complete, sensing lever 60 will have returned to its sensing position in which arm 68 extends through an aperture 36 with lug 69 resting upon a preenergized striker wire 38. Intermediate drive lever 62 will be resting on blocking lug 84. Actuating lever 64 will be in its operative position with indicating flag 102 out of the viewfinder and lug 104 positioned for engagement with lug 128 upon subsequent flash mode operation.

Figure 5:
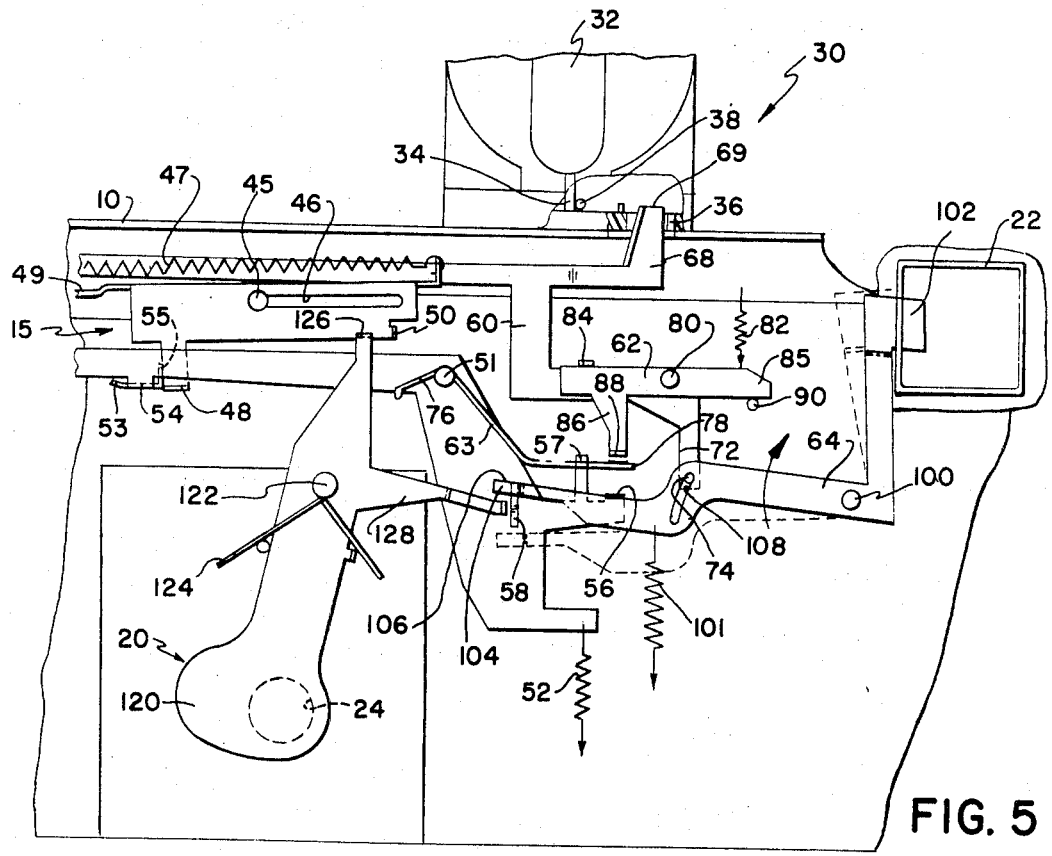
FIG. 5 is a front view of the photographic apparatus with a fired flashlamp being sensed.

The presence of a fired flashlamp in the firing position will be indicated as illustrated in FIG. 5. Sensing arm 68, upon failing to contact a pre-energized striker wire 38, will continue to move upwardly through aperture 36. Such movement will be transmitted through pin 74 to actuating lever 64, causing clockwise rotation of lever 64 about pin 100. Rotation of lever 64 brings indicating flag 102 into viewfinder 22 thereby indicating the presence of a fired flashlamp to the operator. It should be noted that, during sensing, cam 58 on lever 18 will be positioned for engagement with cam surface 106, causing drive lug 104 to pass lug 128 without engagement, thereby insuring that shutter blade 120 is not actuated during the indication of a fired flashlamp. However, cam 58 is rotated out of the path of travel of cam surface 106 when body release lever 18 is rotated by the operator, thereby permitting engagement of drive lug 104 with lug 128 to rotate shutter blade 120 for exposure through aperture 24.

Figure 6:
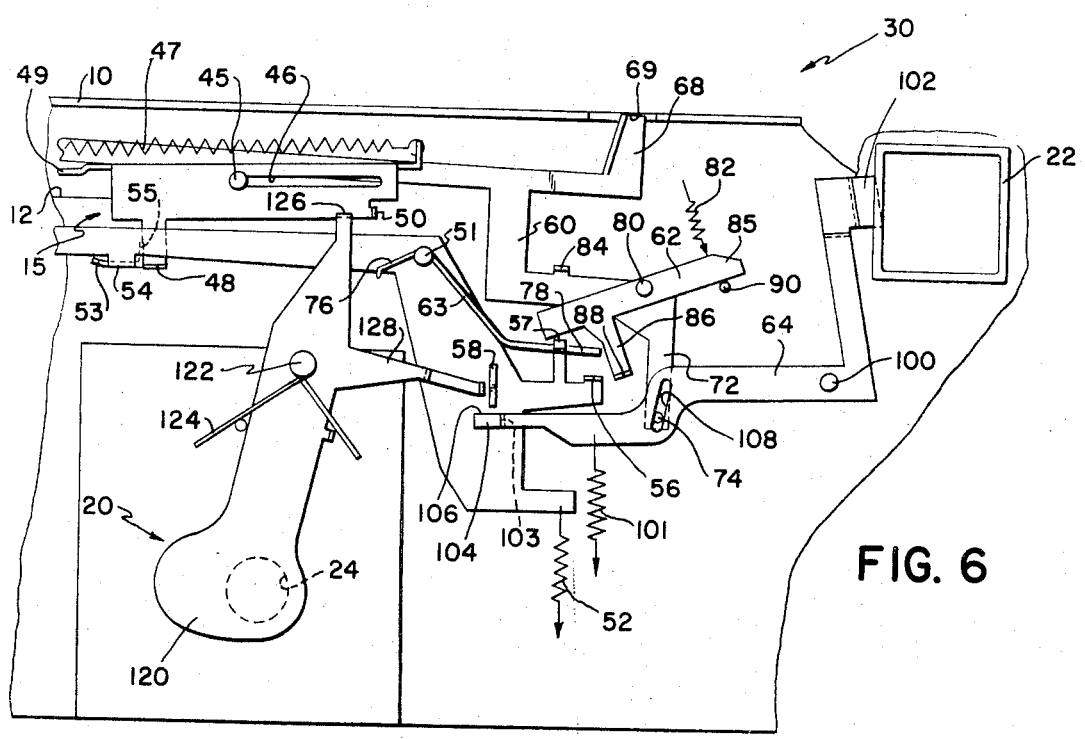
FIG. 6 is a front view of the photographic apparatus without a flashlamp device mounted on the apparatus and with the daylight mode shutter actuating mechanism in position for operation.

When the camera is to be operated without a flash unit inserted in the socket as illustrated in FIG. 6, the T-bar structure will cause sensing lever 60 to be rotated in a clockwise direction so that arm 68 does not extend above top wall 10. Such movement will cause end 85 of intermediate drive lever 62 to engage stop 90 thereby causing counterclockwise rotation of lever 62 about fixed pin 80. This rotation will continue until lug 88 is moved out of the path of movement of lug 56 on body release lever 18, effectively disengaging the flash mode shutter driver. When body release lever 18 is now rotated by pressing tab 59 in a downward direction. lug 56 will not come into engagement with drive spring 63 and lug 88 and therefore sensing arm 68 will not be driven above top wall 10. Moreover, actuating arm 64 will remain in its counterclockwise position with indicating flag 102 held out of viewfinder 22 and lug 104 held away from lug 128 on shutter blade 120. Therefore, shutter actuation in this mode of operation is achieved by shutter driver 15. Lug 48 on shutter driver 15 is disengaged by lug 55 on body release lever 18 as body release lever 18 rotates in a counterclockwise rotation. Shutter driver 15 moves to the left under urging of spring 47. Drive lug 50 thereby is moved to engage lug 126 on shutter blade 120, rotating shutter blade 120 for exposure through aperture 24.

Exposure is again terminated by return of shutter blade 120 to the position illustrated in FIG. 6 under the bias of spring 124. Exposure time will now be dependent upon the energy imparted to blade 120 by engagement of lugs 50 and 126. Exposure time is thus determined by the energy stored in spring 47 and may be designed for an optimum exposure under non-flash conditions.

Upon the operator's release of tab 59, body release lever 18 will return to the position illustrated in FIG. 6 under bias of spring 52. Shutter driver 15 will remain in its unenergized condition until subsequent operation of film advance mechanism 14. Movement of actuating member 40 will bring indexing pin 41 into engagement with indexing arm 49 on shutter driver 15, as may best be seen in FIG. 1. Further movement of actuating member 40 will result in movement of shutter driver 15 to the right until lug 48 moves by cam surface 53 and is engaged by lug 55 on body release lever 18. Shutter driver 15 is now held in its energized condition until subsequent operation of body release lever 18.

This invention has been described in detail with particular reference to the preferred embodiment thereof but will be understood that variations and modifications can be effected within the spirit and scope of the invention.

I claim:

1. For use with flash units of the type having at least one flashlamp fireable by striking and at least one pre-energized striker releasable to effect such striking, photographic apparatus comprising:

a shutter;

means for actuating said shutter;

means for receiving such a flash unit;

a release member movable from a first position to a second position in which said release member is in non-releasing contact with a pre-energized striker of a received unit and from said second position to a third position to release the contacted pre-energized striker;

means for moving said release member from said second position to said third position to effect release of the contacted pre-energized striker;

means, operatively connected between said release member and said moving means, for storing energy while said release member is in said second position prior to movement of said release member to said third position and for imparting stored energy to said release member during movement of said release member to said third position; and means coupling said release member and said shutter actuating means for transmitting energy imparted to said release member to said shutter actuating means to actuate said shutter during movement of said release member to said third position.

2. For use with flash units of the type having at least one flashlamp fireable by striking and at least one pre-energized striker releasable for effecting such striking, photographic apparatus comprising:
a shutter;
means for actuating said shutter;
means for receiving such a flash unit;
a release member positionable in contact with a preenergized striker of a received unit;
means for applying a force to said release member to release the contacted, pre-energized striker;
means for storing energy while said force applying means is applying a force to said release member prior to release of the contacted pre-energized striker of a received unit; and
means coupling said release member and said shutter actuating means for transmitting imparted energy to said shutter actuating means to effect exposure operation of said shutter after release of the contacted pre-energized striker.

3. For use with a multilamp unit of a type having at least one flashlamp fireable by striking and at least one pre-energized striker releasable to effect such striking, photographic apparatus comprising:
a shutter;
means for actuating said shutter;
means for receiving such a multilamp flash unit;
a release member positionable in contact with a pre-ener-gized striker of a received unit;
means for applying a force to said release member to release the contacted pre-energized striker;
means, including a spring, for storing energy during application of a force to said release member and for imparting stored energy to said release member during movement of said release member after release of the contacted pre-energized striker;
and means coupling said release member and said shutter actuating means for transmitting imparted energy to actuate said shutter after release of the contacted pre-energized striker.

4. In photographic apparatus for use with multilamp flash units of the type having at least one lamp fireable by striking and at least one pre-energized striker releasable to effect such striking, said apparatus including:
means for receiving such a flash unit;
a shutter;
means for actuating said shutter;
a release member movable from a first position to a second position in which said release member is in non-releasing contact with a pre-energized striker of a received unit and from said second position to a third position to release the contacted pre-energized striker; and
means for moving said release member from said second position to said third position to effect release of the contacted pre-energized striker;
the improvement comprising:
means, coupling said release member and said shutter actuating means, for synchronizing release of a contacted pre-energized striker and actuation of said shutter, said synchronizing means including resilient means, cooperable with said moving means and said release member, for storing energy while said release member is in said second position and prior to movement of said release member to said third position to effectuate release of a contacted pre-energized striker and for imparting stored energy to said release member for transmission to said shutter actuating means to actuate said shutter during movement of said release member to said third position.

5. Photographic apparatus for use with a multilamp flash unit of the type having at least one flashlamp fireable by striking and at least one pre-energized striker releasable to effectuate said striking, said apparatus comprising:
means for receiving such a flash unit;
a shutter;
means for actuating said shutter;
a body release member movable from a first to a second position;
a striker release member movable from a first position in non-releasing contact with a pre-energized striker of a received flash unit to a second position while effecting release of the contacted pre-energized striker;
means, coupling said body release member and said striker release member, for moving said striker release member from said first to said second position as said body release member moves to said second position, said coupling means including resilient means, gradually energizable during movement of said body release means from said first position prior to movement of said striker release member to said second position, for driving said striker release member to said second position upon release of the contacted preenergized striker by said striker release member under urging of said body release member; and
means coupling said striker release member and said shutter actuating means for actuating said shutter in response to movement of said striker release member to said second position.

* * * * *